(12) United States Patent
Odaohhara (10) Patent No.: US 7,969,119 B2
(45) Date of Patent: Jun. 28, 2011

(54) OVERVOLTAGE PROTECTION

(75) Inventor: Shigefumi Odaohhara, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 12/168,059

(22) Filed: Jul. 3, 2008

(65) Prior Publication Data

US 2009/0009143 A1 Jan. 8, 2009

(30) Foreign Application Priority Data

Jul. 3, 2007 (JP) ................................. 2007-175221

(51) Int. Cl.
*H02J 7/00* (2006.01)
*H02J 7/04* (2006.01)

(52) U.S. Cl. ........................................ 320/134; 320/162

(58) Field of Classification Search .................... 320/134
See application file for complete search history.

(56) References Cited

U.S. PATENT DOCUMENTS

| | | | |
|---|---|---|---|
| 6,222,346 B1 * | 4/2001 | Mori | 320/134 |
| 6,642,694 B2 * | 11/2003 | Yamanaka et al. | 320/134 |
| 7,397,221 B2 * | 7/2008 | Sakuma et al. | 320/134 |
| 2002/0000790 A1 * | 1/2002 | Sano et al. | 320/162 |

FOREIGN PATENT DOCUMENTS

| | | |
|---|---|---|
| JP | 11-252809 | 9/1999 |
| JP | 2000-166107 | 6/2000 |
| JP | 2005-323459 | 11/2005 |

* cited by examiner

*Primary Examiner* — Edward Tso
*Assistant Examiner* — M'Baye Diao
(74) *Attorney, Agent, or Firm* — Ference & Associates LLC (57) ABSTRACT

An overvoltage protection system capable of maintaining a high setting voltage of a battery charger while guaranteeing that cell voltage does not exceed a value limited by a threshold value. In one preferred embodiment, a battery set is a plurality of series-connected battery cells. A protection voltage measurement portion measures a cell voltage of each battery cell. A computation portion calculates an open circuit voltage of the battery set outputs a calculated voltage as a measurement voltage. An overvoltage setting portion stops charging of battery set when the value of the cell voltage of any one of the battery cells reaches a threshold value. A diagnostic voltage measurement portion measures an open circuit voltage of battery set to output measured voltage as a diagnostic voltage. A comparing circuit stops charging of the battery set based on comparison results of value of the measurement voltage and value of diagnostic voltage.

21 Claims, 4 Drawing Sheets

OVERVOLTAGE PROTECTION

CLAIM FOR PRIORITY

This application claims priority from Japanese Application No. 2007-175221 filed on Jul. 3, 2007, and which is fully incorporated by reference as if fully set forth herein.

FIELD OF THE INVENTION

The present invention relates generally to an overvoltage protection system which is employed in an electric charging system for charging a plurality of series-connected battery cells.

BACKGROUND OF THE INVENTION

In a notebook personal computer (hereinafter, referred to as "note PC" for simplicity), which is an example of a portable or mobile type electronic device, power consumption increases as the operating frequency of a CPU increases; and on the other hand, it is requested to provide a longer operation time in a mobile environment and to be smaller in size and lighter in weight. Therefore, most rechargeable batteries mounted on the note PC take a form of a battery pack which includes a plurality of battery cells composed of a lithium ion rechargeable battery having high energy density and in which the battery cells are combined together by series or parallel connection and are accommodated in a housing.

Upon charging/discharging the lithium ion rechargeable battery, it is necessary to precisely control charging/discharging current and voltage. In particular, it is necessary to strictly control the charging voltage in a constant-voltage control period. Therefore, in a battery pack using the lithium ion rechargeable battery, an MPU (microprocessor) is provided within the battery pack. The battery pack generally employs a scheme called a smart battery in which an MPU monitors an internal state of the battery pack during charging and discharging to thereby send information to a note PC body or to activate a protection circuit. The smart battery is a battery device that is compliant with the standards called smart battery system (SBS), initiated by Duracell Inc. (US) and Intel Inc. (US). A battery pack compliant with the above standards is also called an intelligent battery.

In the intelligent battery, an electric circuit portion having, mounted on a substrate, an MPU, a current measurement circuit, a voltage measurement circuit, a remaining capacity calculation circuit, a temperature sensor, and the like, and a plurality of battery cells are accommodated in a housing. The MPU is operable to communicate with an embedded controller of the note PC body via data lines. An overvoltage protection circuit is also installed in the intelligent battery; therefore, when the voltage of the battery cell experiences overvoltage during use, a shutoff element provided in a charger circuit can be operated to stop a charging operation.

According to a technology disclosed in Japanese Laid-open (Kokai) Patent Publication No. 2000-166107, a first protection function portion and a second protection function portion are mounted on a lithium ion battery pack, the first protection function portion operates an FET to stop charging upon detection of a cell voltage of 4.3 V, while the second protection function portion blows a temperature fuse with resistor to stop charging upon detection of a cell voltage of 4.5 V. With such a circuit configuration, even when an abnormality has occurred in the first protection function portion, the second protection functional portion backs up the first protection function portion, guaranteeing that the voltage of the battery cell does not exceed an allowable maximum voltage. According to a technology disclosed in Japanese Laid-open (Kokai) Patent Publication No. 2005-323459, an overdischarge/overcharge detection circuit comprises multiple redundant determination circuits with a plurality of different thresholds for overvoltage detection in a plurality of battery cells.

In the overvoltage protection circuit, in order to guarantee that the cell voltage during charging of the battery cells does not exceed an allowable maximum voltage, it is necessary to forcibly and assuredly stop the charging when the cell voltage exceeds a threshold value. On the other hand, when the battery charger is operating in a normal manner based on the setting voltage, it is necessary to prevent malfunctioning of the overvoltage protection circuit. Since the output voltage of the battery charger has an error with respect to the setting voltage and the cell voltage varies with a change in ambient temperature or drift of the battery charger, it is necessary to provide a fixed margin between the setting value of the battery charger and the threshold value of the overvoltage protection circuit.

In recent years, lithium ion rechargeable batteries are requested to provide a higher safety level. For this reason, related business groups are moving to further tighten the safety standards of the lithium ion rechargeable batteries. Specifically, in the past, the standard allowable maximum voltage of the cell voltage was 4.40 V; however, the standard allowable maximum voltage is now lowered to 4.25 V so the charging system is requested to guarantee that the cell voltage during charging does not exceed the allowable maximum voltage.

In a case where a plurality (three to four) of lithium ion rechargeable batteries are connected in series to form a battery set, the battery charger is operated such that the output voltage applied to both ends of the battery set during a constant voltage control period becomes constant. In order to guarantee that during charging of the battery set, the cell voltage does not exceed the allowable maximum voltage, an overvoltage protection circuit is usually provided for stopping the charging when the cell voltage reaches the threshold value. Moreover, as a backup measure, the cell voltage is controlled so as not to exceed the allowable maximum voltage even when the overvoltage protection circuit is not operating in a normal manner.

According to the conventional overvoltage protection circuit disclosed in Japanese Laid-open (Kokai) Patent Publication No. 2000-166107, in order to guarantee that the cell voltage does not exceed the allowable maximum voltage, the overvoltage protection circuit is duplicated by the first protection function portion that monitors the cell voltage and the second protection function portion. The first protection function portion operates an FET, which is a reversible element, and the second protection function portion operates a temperature fuse, which is a non-reversible element, to thereby stop the charging. Moreover, the threshold values of the first and second protection function portions are set to different values so that the reversible element is operated first. That is, the second protection circuit has the same construction as the first protection circuit so that a prefect backup function can be carried out.

The reason the reversible element is set to operate prior to the non-reversible element is as follows. In a state where the cell voltage approaches a threshold value at which the reversible element is operated, when the cell voltage temporarily exceeds the threshold value due to an abrupt change in ambient temperature or drift of the overvoltage protection system, the charging is preliminarily stopped by the reversible element. However, once the safety is confirmed, the reversible element returns to its original state so that the charging can be resumed. The reason the non-reversible element is set to operate later is as follows. In order to definitely prevent a serious accident which is likely to cause fire hazard, the non-reversible element permanently disables the use of the battery pack when the charging voltage exceeds the threshold value.

Such a construction of the duplicated overvoltage protection circuit composed of the reversible element and the non-reversible element as disclosed in Japanese Laid-open (Kokai) Patent Publication No. 2000-166107 is generally employed in a note PC. In such an overvoltage protection circuit, the charging is not stopped when the charging is performed in a normal manner. It is therefore necessary to set the setting voltage of the battery charger to a low value with a margin relative to the lower threshold value at which the reversible element is operated. However, when the setting voltage of the battery charger is lowered, the full charge capacity decreases or the time to reach the full charge capacity increases, which is therefore undesirable.

According to the determination circuit disclosed in Japanese Laid-open (Kokai) Patent Publication No. 2005-323459, the determination circuit is duplicated or triplicated so that even when one the determination circuits has a fault, the determination is continued by the majority rule. The determination circuits have mutually different overcharge threshold values 3.75 V, 4.0 V, and 4.25 V. Therefore, unless the setting voltage of the battery charger is set to a value lower than the lowest threshold value of the determination circuits, the determination circuit may detect an abnormality as to the overcharging.

In the past, where the allowable maximum voltage of the battery cells is 4.40 V, the setting voltage of the battery charger can be set to 4.20 V for each battery cell even when the overall error of the charging system is considered; therefore, there was no problem concerning the full charge capacity. However, when the allowable maximum voltage is lowered to 4.25 V and when a duplicated overvoltage protection circuit is employed and the setting voltage of the battery charger is lowered by the difference of 0.15 V, it will give rise to another problem that the full charge capacity decreases. It is therefore necessary to provide an overvoltage protection system capable of guaranteeing that the cell voltage does not exceed the allowable maximum voltage in a manner different from the conventional duplicated or triplicated overvoltage protection method.

Accordingly, a compelling need has been recognized in connection with addressing such challenges.

SUMMARY OF THE INVENTION

In accordance with one presently preferred embodiment of the present invention, the principle of the present invention as broadly contemplated lies in providing overvoltage protection for charging batteries that is capable of maintaining a high setting voltage of a battery charger while guaranteeing that a cell voltage does not exceed a value, limited by a threshold value, using a single overvoltage protection circuit.

In summary, one aspect of the invention provides an apparatus, said apparatus comprising: a plurality of series-connected battery cells; a battery charger; a protection voltage measurement portion configured to measure a cell voltage of each of the battery cells; a computation portion configured to calculate an open circuit voltage appearing between opposite terminals of the battery set from the cell voltage of each of the battery cells to output the calculated voltage as a measurement voltage; an overvoltage setting portion configured to output a first stop signal capable of stopping charging of the battery set when the value of the cell voltage of any one of the battery cells reaches a threshold value; a diagnostic voltage measurement portion configured to measure the open circuit voltage of the battery set to thereby output the measured voltage as a diagnostic voltage; and a comparing portion configured to output a second stop signal capable of stopping charging of the battery set based on a comparison result of a value of the measurement voltage and a value of the diagnostic voltage.

Another aspect provides an apparatus, said apparatus comprising: an electronic device; and a battery pack, wherein the battery pack comprises: a battery set having therein a plurality of series-connected battery cells; a protection voltage measurement portion configured to measure a cell voltage of each of the battery cells; a computation portion configured to calculate an open circuit voltage appearing between opposite terminals of the battery set from the cell voltage of each of the battery cells to thereby output a calculated voltage as a measurement voltage; an overvoltage setting portion configured to output a first stop signal capable of stopping charging of the battery set when a value of the cell voltage of any one of the battery cells reaches a threshold value; a diagnostic voltage measurement portion configured to measure an open circuit voltage appearing between opposite terminals of the battery set to output a measured voltage as a diagnostic voltage; and a comparing portion configured to output a second stop signal capable of stopping charging of the battery set based on a comparison result of a value of the measurement voltage and a value of the diagnostic voltage.

Furthermore an additional aspect of the invention provides a method, said method comprising the steps of: measuring a cell voltage of each of the battery cells in a first system to thereby generate a measurement voltage; calculating an open circuit voltage appearing between opposite terminals of the battery set from the cell voltage of each of the battery cells to thereby generate a measurement voltage; stopping the charging when a value of the cell voltage of any one of the battery cells reaches a threshold value; measuring an open circuit voltage appearing between opposite terminals of the battery set in a second system to thereby generate a diagnostic voltage; and stopping the charging based on a comparison result of a value of the measurement voltage and a value of the diagnostic voltage.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

In accordance with one aspect of the present invention, there is provided an overvoltage protection system for charging a battery set having therein a plurality of series-connected battery cells with a battery charger. A protection voltage measurement portion measures a cell voltage of each of the battery cells, and a computation portion calculates an open circuit voltage appearing between opposite terminals of the battery set from the cell voltage of each of the battery cells thereby outputting a calculated voltage as a measurement voltage. An overvoltage setting portion outputs a first stop signal that stops charging of the battery set when the value of the cell voltage of any one of the battery cells reaches a threshold value. Therefore, as long as an overvoltage protection circuit including the protection voltage measurement portion and the overvoltage setting portion is operating in a normal manner, any of the cell voltages of the battery cells will not exceed the value limited by the threshold value. Here, the value limited by the threshold value is determined in consideration of a tolerance of the overvoltage protection circuit with respect to the actual cell voltage.

In the overvoltage protection system according to the present invention, even when the protection voltage measurement portion is not properly operating, the cell voltage does not exceed the value limited by the threshold value. That is, the diagnostic voltage measurement portion measures the open circuit voltage appearing between the opposite terminals of the battery set to output the measured voltage as a diagnostic voltage, and the comparing portion outputs a second stop signal to thereby stop the charging of the battery set when there is an abnormality based on the comparison result of the value of the measurement voltage and the value of the diagnostic voltage. Moreover, the protection voltage measurement portion may measure the cell voltages of the respective battery cells to output the measured cell voltages as the measurement voltage, the diagnostic voltage measurement portion may measure the cell voltages of the respective battery cells to output the measured cell voltages as the diagnostic voltage, and the comparing portion may output the second stop signal that stops the charging of the battery set based on the comparison result of the values of the measurement voltage and the value of the diagnostic voltage.

In the overvoltage protection system according to the present invention, the diagnostic voltage measurement portion and the comparing portion can determine whether or not the protection voltage measurement portion is operating in a normal manner while the system is in operation; however, the diagnostic voltage measurement portion cannot directly carry out the overvoltage protection function. Therefore, in order to guarantee that the cell voltage does not exceed the value limited by the threshold value, it is only necessary to equip a single overvoltage protection circuit including the overvoltage setting portion, and it is not necessary to prepare two different overvoltage protection circuits in duplicate. There will be a case where due to some reasons during charging, the open circuit voltage appearing between the opposite terminals of the battery set increases greater than the setting voltage of the battery charger and the measurement voltage of any one of the battery cells exceeds the threshold value.

In such a case, the overvoltage setting portion outputs the first stop signal to thereby stop the charging, and the value of the diagnostic voltage is not used for stopping the charging; therefore, the threshold value of the overvoltage protection circuit can be set with one level. In the overvoltage protection system according to the present invention, the threshold value for overvoltage protection can be set with one level. Therefore, the setting voltage of the battery charger can be set to a value selected with a margin necessary for a tolerance of the overvoltage protection circuit and a tolerance of the output voltage of the battery charger with respect to the setting voltage. Accordingly, it is possible to maintain a high setting value compared with the case where the overvoltage protection circuit is duplicated.

The diagnostic voltage measurement portion measures the open circuit voltage of the battery set to output the measured voltage as the diagnostic voltage. In a case where the overvoltage protection circuit is duplicated like the conventional method, the diagnostic voltage measurement portion needs to measure the cell voltage as well. However, in the present invention, since the diagnostic voltage measurement portion only needs to measure the open circuit voltage, it is possible to simplify the circuit structure compared with the case of measuring the cell voltage. Since the threshold value of the overvoltage setting portion is set such that the cell voltage of the battery cell does not exceed the allowable maximum voltage, the setting voltage of the battery charger can be set to the maximum value that is allowed in the charging system. The maximum value that is allowed in the charging system is determined in consideration of a margin necessary for a tolerance of the overvoltage protection circuit with respect to the actual cell voltage and a tolerance of the output voltage of the battery charger with respect to the setting voltage.

The first stop signal may operate a reversible shutoff element such as an FET installed in the charging circuit, and the second stop signal may operate a non-reversible shutoff element. When the second stop signal is output, it is the case where either of the protection voltage measurement portion or the diagnostic voltage measurement portion is abnormal. In such a case, in order to forcibly and assuredly stop the charging and to guarantee that the cell voltage does not exceed the value limited by the threshold value, it is preferable to operate a non-reversible shutoff element different from the reversible shutoff element that is operated by the first stop signal. The reason the reversible shutoff element is operated by the first stop signal is because when the cell voltage temporarily exceeds the threshold value due to a change in ambient temperature or drift of the battery charger, it is preferable to resume the charging after confirming the safety.

The diagnostic voltage measurement portion may be configured to compare the value of the measurement voltage with the value of the diagnostic voltage during a period from the start to the end of the charging of the battery set to thereby output the second stop signal for stopping the charging of the battery set based on the comparison results. By doing this, it is possible to increase the possibility of detecting an abnormality in the protection voltage measurement portion or the diagnostic voltage measurement portion in an initial period of the charging where the cell voltage is low. Therefore, it is possible to increase the safety level as to the allowable maximum voltage guarantee compared with the case where the second stop signal is output in a period where the cell voltage is high to thereby stop the charging. The protection voltage measurement portion and the diagnostic voltage measurement portion may be implemented as mutually independent semiconductor devices. Alternatively or additionally, a wiring system between the diagnostic voltage measurement portion and the battery cells may be separated from a wiring system between the protection voltage measurement portion and the battery cells. By doing so, the protection voltage measurement portion and the diagnostic voltage measurement portion may become highly independent and the system reliability will be further improved.

In accordance with the above-mentioned diverse aspects of the present invention, it is possible to provide an overvoltage protection system capable of maintaining a high setting voltage of a battery charger while guaranteeing that a cell voltage does not exceed a value limited by a threshold value. Further, it is possible to provide an overvoltage protection system capable of guaranteeing that a cell voltage does not exceed a value limited by a threshold value while using a single overvoltage protection circuit. Furthermore, it is possible to provide a battery pack and electronic device incorporating the overvoltage protection system and to provide an overvoltage preventing method that is executed in the overvoltage protection system.

Figure 1:
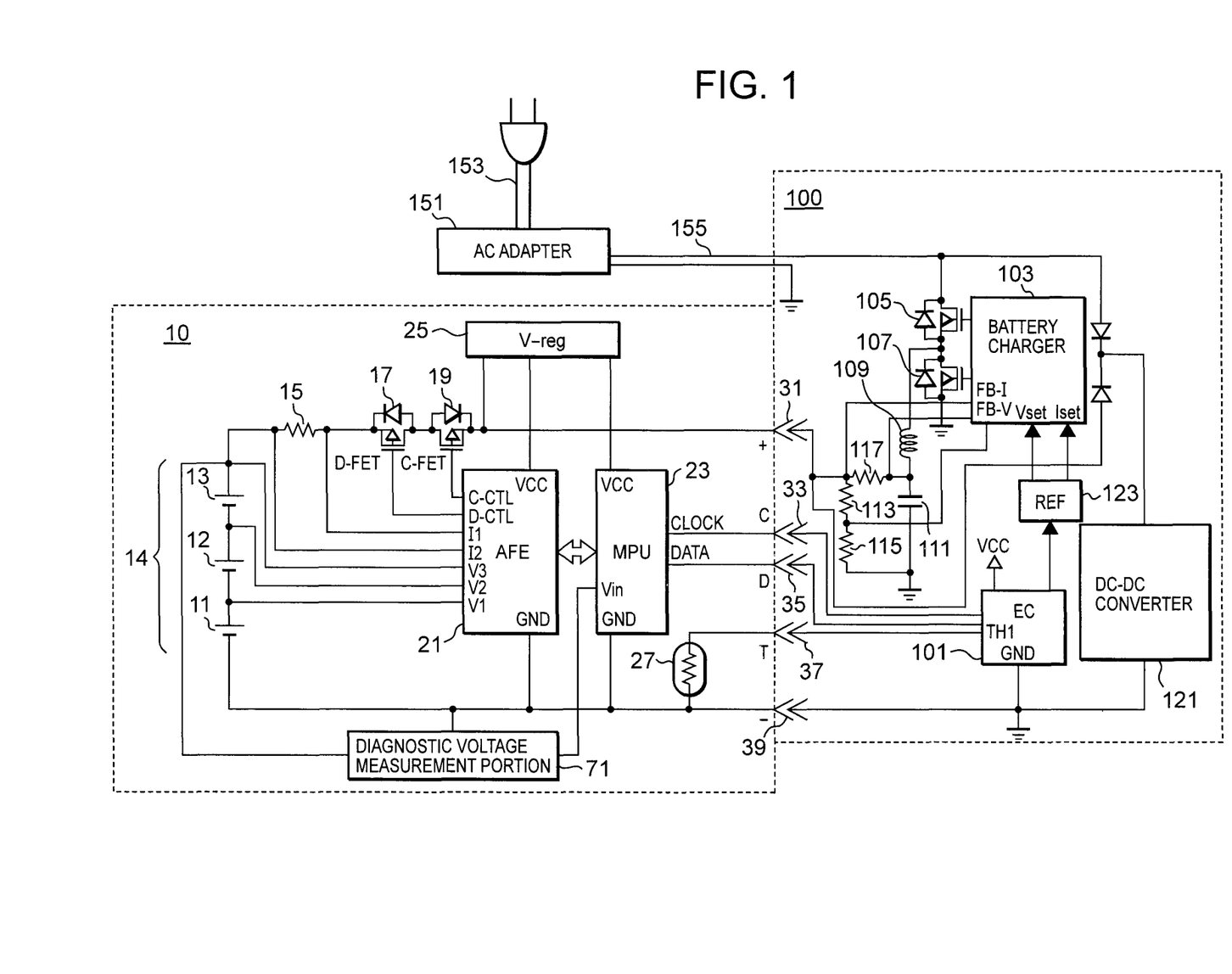
FIG. 1 is a block diagram illustrating a charging system including a battery pack and a note PC according to an embodiment of the present invention.

The discussion will now turn to the drawings. Referring now to FIG. 1, a block diagram illustrating an outlined internal construction of a battery pack 10 in compliance with the SBS standards and a note PC 100 according to one embodiment of the present invention. The battery pack 10 has installed in a housing thereof, many electronic components including a battery set 14 composed of three, series-connected lithium ion battery cells 11 to 13, a sense resistor 15, a discharge FET 17, a charge FET 19, an AFE (analog front end) 21, an MPU (micro processing unit) 23, a voltage regulator 25, a thermistor 27, and a diagnostic voltage measurement portion. The battery pack 10 is connected to the note PC 100 via five terminals of a positive (+) terminal 31, a C terminal 33, a D terminal 35, a T terminal 37, and a negative (−) terminal 39. A discharging current from the battery set 14 and a charging current to the battery set 14 flow between the battery set 14 and the note PC 100 via the positive (+) terminal 31 and the negative (−) terminal 39. The C terminal 33 and the D terminal 35 are connected to a clock terminal and a data terminal of the MPU 23, respectively, and the T terminal 37 is connected to the thermistor 27, which is an element for measuring temperature around the battery cells 11 to 13.

The AFE 21 and the MPU 23 are integrated circuits that are operated by a constant voltage delivered from the voltage regulator 25. Data are exchanged between the AFE 21 and the MPU 23. The AFE 21 includes analog input terminals V1, V2, and V3 for acquiring the respective potential difference in the battery cells 11 to 13 and analog input terminals I1 and I2 for acquiring potential difference across the sense resistor 15. The AFE 21 also includes analog output terminals D-CTL and C-CTL for outputting signals that control on/off of the discharge FET 17 and the charge FET 19. The AFE 21 measures the respective cell voltages, converts the measurement values into digital values, and delivers the converted values to the MPU 23.

The AFE 21 measures the charging current and the discharging current flowing in the battery set 14 from the voltage detected by the sense resistor 15, converts the measurement values into digital values, and delivers the converted values to the MPU 23. The MPU 23 is an integrated circuit in which in addition to an 8 to 16 bit CPU, a RAM, a ROM, a flash memory, and a timer are integrated into one package. The MPU 23 monitors the amount of charged or discharged electricity based on the voltage or current measurement values delivered from the AFE 21 to thereby calculate a remaining capacity. Moreover, the MPU 23 has an overcurrent protection function, an overvoltage protection function (also referred to as overcharge protection function), and an undervoltage protection (also referred to as overdischarge protection function). Upon detection of an abnormality in the battery pack 10 from the voltage or current measurement value delivered from the AFE 21, the MPU 23 opens either or both of the discharge FET 17 and the charge FET 19 to protect the battery pack 10 from possible damage. The overcurrent protection function, the overvoltage protection function, and the undervoltage protection function are implemented as a program that is executed by the MPU 23.

A clock line and a data line from the MPU 23 are connected to an embedded controller (EC) 101 at the note PC 100 side via the C terminal 33 and the D terminal 35, respectively, so that the MPU 23 can communicate with the EC 101. The MPU 23 transmits the values of the setting current and voltage, which are to be programmed in the battery charger 103, to the EC 101 via the data line. Then, the EC 101 programs the setting values into the battery charger 103 via a reference voltage source 123 to thereby control the operation of the battery charger 103. The MPU 23 can stop the operation of the battery charger 103 by designating zero (0) as the values of the setting current or voltage, which are to be set in the battery charger. The diagnostic voltage measurement portion 71 measures an open circuit voltage, which is a voltage across the battery set 14, and outputs the open circuit voltage to an analog input terminal Vin of the MPU 23. Detailed description of the overvoltage protection system according to the present invention, including the diagnostic voltage measurement portion 71 will be provided later.

The power management function of the note PC 100 is mainly implemented by the EC 101 and also by the battery charger 103 and a DC-DC converter 121. The EC 101 is an integrated circuit that controls many hardware elements of the note PC 100 as well as the power supply. The EC 101 can acquire information on a remaining capacity of the battery set 14 and the setting voltage and current of the battery charger 103 through communication with the MPU 23. Moreover, the EC 101 receives information on the open circuit voltage and the current flowing in the battery set 14 from the MPU 23 during charging and discharging. Furthermore, the EC 101 detects a resistance value of the thermistor 27 that varies depending on the temperature around the battery cells 11 to 13 and notifies the MPU 23 that there is an abnormality in the detected temperature. Then, the MPU 23 turns off the discharge FET 17 and the charge FET 19 to thereby stop the charging or discharging.

The battery charger 103 includes a switching circuit composed of an FET 105 and an FET 107 and a smoothing circuit composed of an inductor 109 and a capacitor 111. The battery charger 103 suppresses the pulsation of the output current having passed through the switching circuit by using the smoothing circuit, converts a DC voltage input from an AC adaptor 151 into a DC voltage suitable for charging the battery set 14, and outputs the converted DC voltage to the battery pack 10. The battery charger 103 charges the battery set 14 by a constant-current/constant-voltage (CCCV) method. To a current setting value input Iset and a voltage setting value input Vset of the battery charger 103, a voltage from the reference voltage source 123 is input, the voltage being divided from a constant voltage generated within the note PC 100.

The reference voltage source 123 inputs the setting voltage to the voltage setting value input Vset and the setting current to the current setting value input Iset in accordance with instructions from the EC 101. To the voltage feedback input FB-V and the current feedback input FB-I of the battery charger 103, voltage-dividing resistors 113 and 115 provided at the note PC side and an output from the sense resistor 117 are connected, respectively, and the output voltage and current of the battery charger 103 are input.

The AC adaptor 151 has a primary side thereof connected to a commercial power supply by an AC cord 153 and a secondary side thereof connected to the note PC 100 by a DC cable 155. The DC-DC converter 121 converts the DC voltage input from the AC adaptor 151 or the DC voltage input from the battery set 14 into a necessary voltage to thereby supply the necessary voltage to a system load (not shown) within the note PC 100.

It is to be understood that FIG. 1 only illustrate the primary hardware constructions related to the present embodiment and the connections in order to describe the present embodiment. In addition to the components described above, many other electric circuits and devices such as a magnetic disk, an optical disk, or a keyboard are employed for the constitution of the battery pack 10 and the note PC 100. However, since these are well known to one having ordinary skill in the art, detailed explanations for them will not be provided here. Of course, a plurality of blocks shown in FIG. 1 may form a single integrated circuit or device, or one block may be divided into a plurality of integrated circuits or devices, and these configurations are also included within the scope of the present invention, so long as one having ordinary skill in the art can arbitrarily select the configurations.

Figure 2:
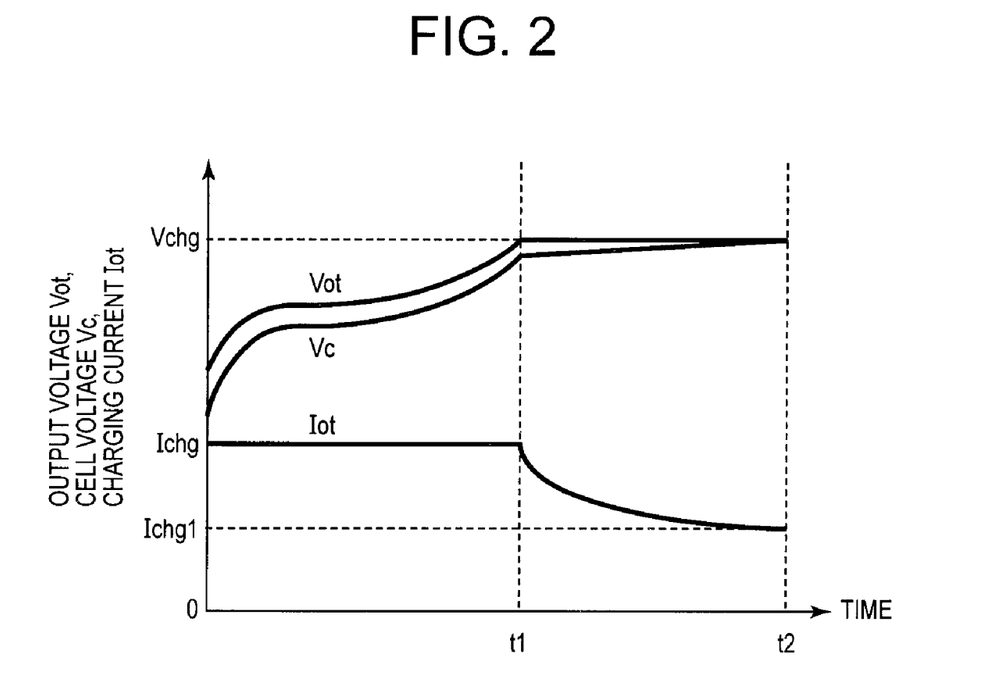
FIG. 2 is a diagram for explaining change with time of a charging voltage and a charging current output from a battery charger after charging is started.

FIG. 2 is a diagram for explaining change with time of the output voltage Vot and the output current Iot output from the battery charger 103 after the start of charging. The battery charger 103 charges the battery set 14 by a constant-current/constant-voltage method. The setting voltage Vchg in a constant voltage control period is set to the voltage setting value input Vset of the battery charger 103, while the setting current Ichg in a constant current control period is set to the current setting value input Iset. When the battery charger 103 starts charging at time t0, the battery charger 103 operates the FET 105 and the FET 107 to thereby control the output voltage Vot so that the output current Iot becomes the setting current Ichg. Since a resistor is present between the battery charger 103 and the battery set 14, the open circuit voltage Vc of the battery set 14 has a value lower than the output voltage Vot of the battery charger 103.

The period between the charge start time and time t1 corresponds to a constant current control period, and the period between time t1 and time t2 corresponds to a constant voltage control period. When the output voltage Vot fed back to the battery charger 103 becomes equal to the setting voltage Vchg, the battery charger 103 enters the constant voltage control period and operates the FET 105 and the FET 107 so that the output voltage Vot becomes equal to the setting voltage Vchg. At a time at which the output current Iot reaches a discharge termination current Ichg1 during the constant voltage control period, the charging is terminated. At a time the charging is terminated, the open circuit voltage Vc of the battery set 14 becomes substantially equal to the output voltage Vot. The amount of electricity charged during a period between time t0 and time t2 becomes the full charge capacity of the battery cells 11 to 13. Therefore, by setting the setting voltage Vchg of the battery charger 103 as high as possible within an allowable range, it is possible to increase the full charge capacity and to shorten the charging time.

The battery charger 103 controls the output voltage Vot such that the setting voltage Vchg is maintained within an error range in the constant voltage control period as long as the battery charger 103 is operating in a normal manner. However, although it is possible to manage the upper limit of the open circuit voltage of the battery set 14, it is not possible to manage the respective cell voltages of the battery cells 11 to 13 of the battery set 14 so as not to exceed an allowable maximum value.

Figure 3:
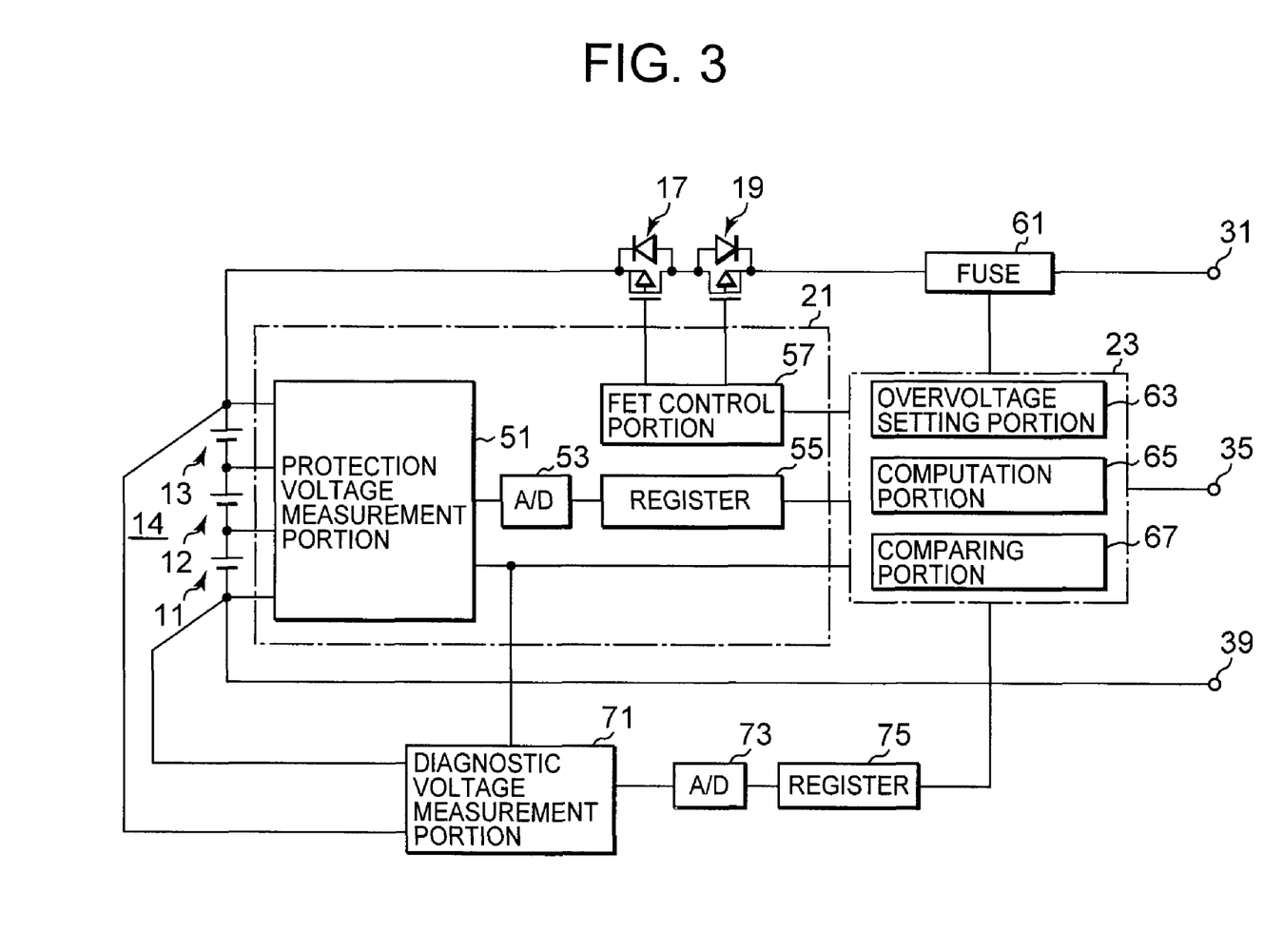
FIG. 3 is a block diagram for explaining an overvoltage protection system of the battery pack shown in FIG. 1.
Figure 4:
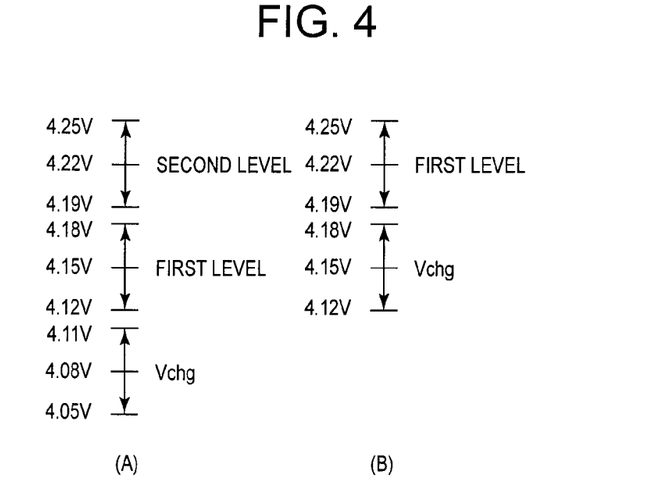
FIGS. 4A and 4B are diagrams for comparison of the setting voltage of a battery charger in a conventional duplicated overvoltage protection circuit and an overvoltage protection system according to the present embodiment.

FIG. 3 is a block diagram for explaining the overvoltage protection system of the battery pack 10 shown in FIG. 1. FIG. 3 shows a fuse 61, an A/D converter 73, and a register 75, which were omitted in FIG. 1 and also shows the internal constructions of the AFE 21 and the MPU 23. The fuse 61 is a non-reversible shutoff element that is provided in a charging/discharging circuit to shut off the circuit by being blown when an operation current delivered from the MPU 23 flows through an internal resistor.

The AFE 21 includes a protection voltage measurement portion 51, an A/D converter 53, a register 55, and an FET control portion 57. The protection voltage measurement portion 51 measures the respective voltages of the series-connected battery cells 11 to 13 of the battery set 14. The protection voltage measurement portion 51 includes therein a selector that operates in accordance with instructions from the MPU 23, and sequentially delivers the measurement values of the cell voltage measured to the A/D converter 53 while changing the battery cells to be measured. The A/D converter 53 delivers the measurement values to the register 55, and the MPU 23 periodically reads out data from the register 55. The FET control portion 57 opens the charge FET 19 and the discharge FET 17 in accordance with a stop signal from the MPU 23.

The diagnostic voltage measurement portion 71 measures the open circuit voltage of the battery set 14 at the time of receipt of instructions from the MPU 23 and delivers the measurement value to the A/D converter 73. The A/D converter 73 delivers the measurement value to the register 75, and the MPU 23 periodically reads out the values of the register 75. The MPU 23 includes an overvoltage setting portion 63, a computation portion 65, and a comparing portion 67. The overvoltage setting portion 63, the computation portion 65, and the comparing portion 67 are implemented as a program that is executed by a processor. In the present invention, however, these portions may be implemented as hardware. In the overvoltage setting portion 63, a threshold value for maintaining an allowable maximum voltage of the battery cells 11 to 13 that the overvoltage protection system guarantees is set.

In the present embodiment, since the protection voltage measurement portion 51 has a measurement tolerance of ±0.03 V, the overvoltage setting portion 63 sets the setting value to 4.22 V with an allowable maximum voltage of 4.25 V to thereby guarantee that the cell voltage does not exceed the allowable maximum voltage. The overvoltage setting portion 63 transmits a stop signal to the FET control portion 57 when the cell voltage of any one of the battery cells exceeds a threshold value. The computation portion 65 is periodically supplied with the cell voltages of the respective battery cells from the register 55, and sums up the values to calculate the open circuit voltage of the battery set 14 and transmits the calculated open circuit voltage to the comparing portion 67. Moreover, the cell voltages of the respective battery cells 11 to 13 are periodically transmitted to the overvoltage setting portion 63. The comparing portion 67 compares the open circuit voltage of the battery set 14 delivered from the register 75 with the open circuit voltage delivered from the computation portion 65 and transmits a stop signal to the fuse 61 to thereby blow the fuse 61 when it is determined that the difference is equal to or greater than a predetermined value.

The difference equal to greater than the predetermined value is determined in consideration of a tolerance caused by the protection voltage measurement portion 51 and the A/D converter 53 and a tolerance caused by the diagnostic voltage measurement portion 71 and the A/D converter 73. In addition, the determination as to whether the difference is equal to or greater than the predetermined value may be carried out based on comparison of a plurality of data. When transmitting the stop signal to the fuse 61, the comparing portion 67 may also transmit the stop signal to the FET control portion 57 to thereby open the charge FET 19 and the discharge FET 17, and at the same time, the comparing portion 67 may instruct the EC 101 to stop the operation of the battery charger 103.

Next, the operation of the overvoltage protection system shown in FIG. 3 will be described. The MPU 23 transmits the setting current Ichg and the setting voltage Vchg to the EC 101. The EC 101 programs the setting current Ichg and the setting voltage Vchg into the reference voltage source 123. Then, the reference voltage source 123 supplies the voltage values corresponding to them to the current setting value input Iset and the voltage setting value input Vset of the battery charger 103 to thereby start the operation of the battery charger 103. The battery charger 103 starts charging of the battery set 14 by a constant current control.

The protection voltage measurement portion 51 measures the cell voltages of the respective battery cells 11 to 13 at the time of receipt of instructions from the MPU 23 and delivers the measured cell voltages to the computation portion 65 via the A/D converter 53 and the register 55. At this time, the diagnostic voltage measurement portion 71 measures the open circuit voltage of the battery set 14 at the time of receipt of instructions from the MPU 23 and delivers the measured open circuit voltage as a diagnostic voltage to the comparing portion 67 via the A/D converter 73 and the register 75. The computation portion 65 sums up the cell voltages of the respective battery cells 11 to 13 to calculate the open circuit voltage of the battery set 14, and delivers the calculated open circuit voltage as a measurement voltage to the comparing portion 67. The comparing portion 67 compares the measurement voltage delivered from the computation portion 65 corresponding to the open circuit voltage of the battery set 14 with the diagnostic voltage delivered from the register 75 at a predetermined time.

As long as the difference between them is within an allowable tolerance range, the comparing portion 67 does not transmit the stop signal to the fuse 61. As long as any one of the cell voltages of the battery cells 11 to 13 delivered from the computation portion 65 does not exceed the threshold value of 4.22 V, the overvoltage setting portion 63 does not transmit the stop signal to the FET control portion 57. When any one of the cell voltages of the battery cells 11 to 13 delivered from the computation portion 65 exceeds the threshold value of 4.22 V, the overvoltage setting portion 63 transmits the stop signal to the FET control portion 57. Then, the FET control portion 57 opens the charge FET 19 to thereby stop charging and moreover opens the discharge FET 17 to thereby prohibit discharging. At this time, the overvoltage setting portion 63 may instruct the EC 101 to stop the operation of the battery charger 103.

The MPU 23 instructs the EC 101 to set the setting current Ichg and the setting voltage Vchg to zero, and the EC 101 sets zero to the current setting value input Iset and the voltage setting value input Vset via the reference voltage source 123. As a result, the battery charger 103 stops the charging. Such an operation is continuously carried out throughout the constant current control period and the constant voltage control period from the start to the end of the charging.

As long as the protection voltage measurement portion 51 is measuring the cell voltage within a predetermined tolerance range, any one the cell voltages of the battery cells 11 to 13 will exceed the allowable maximum voltage during the charging. In a case where the charge FET 19 does not open with the control signal from the FET control portion 57 even when the stop signal was transmitted to the FET control portion 57 by the overvoltage setting portion 63, the MPU 23 detects the charging current not becoming zero even when the stop signal is transmitted to the FET control portion 57 and then instructs the EC 101 to stop the battery charger 103. In a case where the MPU 23 has a trouble and is thus unable to read out data from the register 55, the EC 101 detects the fault in the MPU 23 from the fact that the voltage and the current during the charging are not transmitted from the MPU 23 to thereby stop the battery charger 103. In a case where the EC 101 is unable to communicate with the MPU 23, the EC 101 stops the operation of the battery charger 103 in a similar manner.

When the battery charger 103 or the EC 101 has a trouble, there is a case where the battery charger 101 continues its operation even when a charge stop signal is transmitted from the MPU 23 to the EC 101. In such a case, since the overvoltage setting portion 63 transmits the stop signal to the FET control portion 57, any one of the cell voltages of the battery cells 11 to 13 will not exceed the allowable maximum voltage when the charge FET 19 is opened by the FET control portion 57. However, when the protection voltage measurement portion 51 has a trouble and is thus unable to measure the cell voltage properly, even though the overvoltage setting portion 63 outputs the stop signal with the threshold value of 4.22 V, at that moment, there is a possibility that any one of the cell voltages of the battery cells exceeds 4.25 V.

In the overvoltage protection system according to the present embodiment, using the diagnostic voltage measured by the diagnostic voltage measurement portion 71, the cell voltage is controlled so as not to exceed 4.25 V, which is the allowable maximum voltage, even when the protection voltage measurement portion 51 and the A/D converter 53 are not operating in a normal manner. The comparing portion 67 compares the measurement voltage, which is the open circuit voltage of the battery set 14 delivered from the computation portion 65 with the diagnostic voltage delivered from the register 75 and transmits the stop signal to the fuse 61 when the difference between them exceeds a predetermined value. As a result, the fuse 61 is blown, whereby the battery pack 10 is unable to be charged or discharged unless the fuse 61 is replaced. The comparing portion 67 may transmit the stop signal to the FET control portion 57 as well as the fuse 61 to thereby open the charge FET 19 and the discharge FET 17. Moreover, the comparing portion 67 may instruct the EC 101 to stop the battery charger 103.

The diagnostic voltage measurement portion 71 detects that the protection voltage measurement portion 51 and the A/D converter 53 are not operating in a normal manner to thereby carrying out a function of preliminarily eliminating the possibility that the cell voltage exceeds 4.25 V. Even when the diagnostic voltage measurement portion 71 and the A/D converter 73 are not operating in a normal manner, the comparing portion 67 transmits a charge stop signal to the fuse 61 when the difference between them exceeds a predetermined value.

In the overvoltage protection system, since the diagnostic voltage measurement portion 71 does not function as the immediate overvoltage protection circuit, it is possible to set the overvoltage protection threshold of the cell voltage to have a single level. Therefore, the setting voltage Vchg of the battery charger 103 only needs to be smaller than the single-level threshold value and can be set higher than that of a duplicated overvoltage protection circuit where the threshold value is set to have two levels. FIG. 4A shows the setting voltage Vchg of a battery charger when a conventional duplicated overvoltage protection circuit is employed. FIG. 4B shows the setting voltage Vchg of a battery charger when a single overvoltage protection system according to the present embodiment is employed. The setting voltage Vchg of a battery charger is converted into a cell voltage by dividing the open circuit voltage of a battery set by the number of battery cells. In either figure, it is assumed that the operating voltage of the overvoltage protection circuit has a tolerance of ±0.03 V and that the output voltage of the battery charger has a tolerance of ±0.03 V with respect to the setting voltage Vchg. It is also assumed that a margin of 0.01 V is provided between the output voltages of the overvoltage protection circuits and between the output voltages of the overvoltage protection circuit and the battery charger.

When the output voltage of the battery charger falls within the tolerance range with respect to the setting voltage Vchg and when it is set such that both a first-stage overvoltage protection circuit and a second-stage overvoltage protection circuit are not operating, the setting voltage Vchg of the battery charger becomes 4.08 V in FIG. 4A, while the setting voltage Vchg becomes 4.15 V in FIG. 4B. Therefore, in the overvoltage protection system according to the present embodiment, the charging voltage can be increased by 0.07 V. Such an increase in the charging voltage is due to the following reasons. In the conventional method, a duplicated overvoltage protection circuit is used in order to prevent the cell voltage from exceeding the allowable maximum value. However, in the present embodiment, while using a single overvoltage protection circuit, when a diagnostic circuit including the diagnostic voltage measurement portion 71 and the comparing portion 67 detects an abnormality in the overvoltage protection circuit or its own abnormality, the control proceeds to a safe mode to stop the operation of a charging system.

Since the diagnostic voltage measurement portion 71 only needs to be able to measure the open circuit voltage of the battery set 14, it is possible to simplify the circuit structure compared with the protection voltage measurement portion 51. Therefore, it is possible to decrease the cost and to increase the reliability compared with the case where the AFE 21 including the protection voltage measurement portion 51 is duplicated. As a matter of course, the diagnostic voltage measurement portion 71 may measure the cell voltages, and the comparing portion 67 may compare the cell voltages with each other to output the stop signal. The diagnostic voltage measurement portion 71 may be implemented as the same semiconductor device as the AFE 21; however, in order to increase the safety level, it is preferable to implement the diagnostic voltage measurement portion 71 as a separate semiconductor device.

Figure 5:
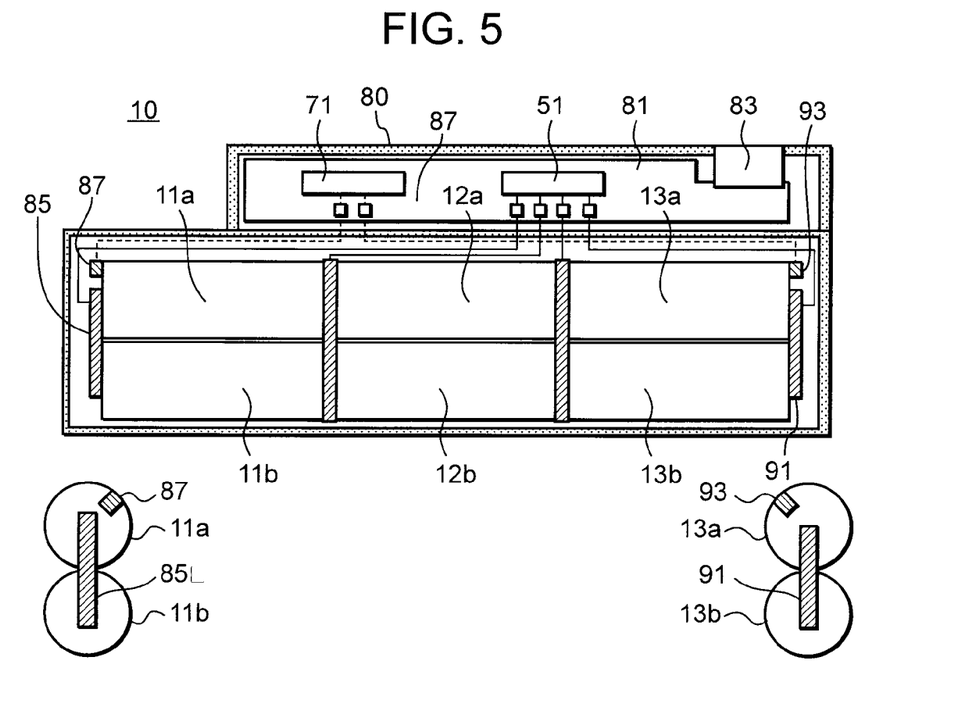
FIG. 5 is a plan view for explaining a wiring structure of a battery pack.

FIG. 5 is a plan view illustrating an internal construction of the battery pack 10. In a housing 80, a circuit board 81 and six battery cells 11a to 13b are accommodated. On the circuit board 81, the components shown in FIG. 3 excluding the battery cells are mounted. The battery cells are constructed such that three sets of two, parallel-connected battery cells are connected in series to thereby form a battery set. The battery cells and the protection voltage measurement portion 51 are connected via four wirings denoted by solid lines. Both end electrodes of the battery set and the diagnostic voltage measurement portion 71 are connected via two wirings denoted by broken lines.

The connections between the battery cells 11a and 11b and the respective wirings are carried out by terminals 87 and 85, respectively. The connections between the battery cells 13a and 13b and the respective wirings are carried out by terminals 91 and 93, respectively. In this manner, the wirings and terminals for connection from the battery cells to the protection voltage measurement portion 51 and the diagnostic voltage measurement portion 71 are mutually independent from each other, decreasing the possibility that voltages are not supplied to both of them. In the overvoltage protection system according to the present embodiment, as long as either one of the protection voltage measurement portion or the diagnostic voltage measurement portion is operating in a normal manner, it is possible to detect an abnormality in the other one of the measurement portions to thereby stop the charging. Therefore, it is possible to further increase the safety level thanks to such a wiring method.

Although the battery pack 10 shown in FIG. 1 is compliant with the SBS standards, the present invention can be applied to an overvoltage protection system for use with a battery pack called a dumb battery that is not compliant with the SBS standards. According to an example of the dumb battery, the MPU 23 shown in FIG. 1 is provided at the side of the note PC 100. In such a case, the functions of the MPU 23 and the EC 101 may be integrated. According to another example of the dumb battery, the AFE 21 and the MPU 23 is provided at the side of the note PC 100. In such a case, the diagnostic voltage measurement portion 71 is also provided at the side of the note PC. That is, the overvoltage protection system according to the present embodiment can be applied to a charging system in which it is necessary that the battery set 14 is accommodated in the housing, but in which the other elements or the semiconductor device may be provided in the housing of the battery pack or may be provided in the note PC 100.

The present invention has been described with reference to the specific embodiment illustrated in the drawings. However, the present invention is not limited to this embodiment, and of course, so long as the effects provided by the present invention are obtained, any kind of well known configuration can be employed.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus, said apparatus comprising:
   a plurality of series-connected battery cells;
   a battery charger;
   a protection voltage measurement portion configured to measure a cell voltage of each of the battery cells;
   a computation portion configured to calculate an open circuit voltage appearing between opposite terminals of the battery set from the cell voltage of each of the battery cells to output the calculated voltage as a measurement voltage;
   an overvoltage setting portion configured to output a first stop signal capable of stopping charging of the battery set when the value of the cell voltage of any one of the battery cells reaches a threshold value;
   a diagnostic voltage measurement portion configured to measure the open circuit voltage of the battery set to thereby output the measured voltage as a diagnostic voltage; and
   a comparing portion configured to output a second stop signal capable of stopping charging of the battery set based on a comparison result of a value of the measurement voltage and a value of the diagnostic voltage.

2. The apparatus according to claim 1, wherein the threshold value is set such that the cell voltage of each of the battery cells does not exceed an allowable maximum voltage.

3. The apparatus according to claim 1, further comprising a charging circuit provided with a reversible shutoff element and a non-reversible shutoff element, and wherein the first stop signal operates the reversible shutoff element and the second stop signal operates the non-reversible shutoff element.

4. The apparatus according to claim 2, further comprising a charging circuit provided with a reversible shutoff element and a non-reversible shutoff element, and wherein the first stop signal operates the reversible shutoff element and the second stop signal operates the non-reversible shutoff element.

5. The apparatus according to claim 1, wherein the comparing portion compares the value of the measurement voltage with the value of the diagnostic voltage during a period from starting to ending of the charging of the battery set to thereby output the second stop signal capable of stopping the charging of the battery set based on the comparison result.

6. The apparatus according to claim 2, wherein the comparing portion compares the value of the measurement voltage with the value of the diagnostic voltage during a period from starting to ending of the charging of the battery set to thereby output the second stop signal capable of stopping the charging of the battery set based on the comparison result.

7. The apparatus according to claim 3, wherein the comparing portion compares the value of the measurement voltage with the value of the diagnostic voltage during a period from starting to ending of the charging of the battery set to thereby output the second stop signal capable of stopping the charging of the battery set based on the comparison result.

8. The apparatus according to claim 4, wherein the comparing portion compares the value of the measurement voltage with the value of the diagnostic voltage during a period from starting to ending of the charging of the battery set to thereby output the second stop signal capable of stopping the charging of the battery set based on the comparison result.

9. The apparatus according to claim 1, wherein the protection voltage measurement portion and the diagnostic voltage measurement portion are configured by semiconductor devices, which are independent from one another.

10. The apparatus according to claim 2, wherein the protection voltage measurement portion and the diagnostic voltage measurement portion are configured by semiconductor devices, which are independent from one another.

11. The apparatus according to claim 3, wherein the protection voltage measurement portion and the diagnostic voltage measurement portion are configured by semiconductor devices, which are independent from one another.

12. The apparatus according to claim 6, wherein the protection voltage measurement portion and the diagnostic voltage measurement portion are configured by semiconductor devices, which are independent from one another.

13. The apparatus according to claim 1, wherein a wiring system between the diagnostic voltage measurement portion and the battery cells is configured to be separate from a wiring system between the protection voltage measurement portion and the battery cells.

14. The apparatus according to claim 10, wherein a wiring system between the diagnostic voltage measurement portion and the battery cells is configured to be separate from a wiring system between the protection voltage measurement portion and the battery cells.

15. The apparatus according to claim 10, wherein the protection voltage measurement portion is configured to output a measured voltage as a measurement voltage; and the diagnostic voltage measurement portion is configured to measure a cell voltage of each of the battery cell to thereby output a diagnostic voltage.

16. An apparatus, said apparatus comprising:
    an electronic device; and
    a battery pack, wherein the battery pack comprises:
        a battery set having therein a plurality of series-connected battery cells;
        a protection voltage measurement portion configured to measure a cell voltage of each of the battery cells;
        a computation portion configured to calculate an open circuit voltage appearing between opposite terminals of the battery set from the cell voltage of each of the battery cells to thereby output a calculated voltage as a measurement voltage;
        an overvoltage setting portion configured to output a first stop signal capable of stopping charging of the battery set when a value of the cell voltage of any one of the battery cells reaches a threshold value;
        a diagnostic voltage measurement portion configured to measure an open circuit voltage appearing between opposite terminals of the battery set to output a measured voltage as a diagnostic voltage; and a comparing portion configured to output a second stop signal capable of stopping charging of the battery set based on a comparison result of a value of the measurement voltage and a value of the diagnostic voltage.

17. The apparatus according to claim 16, wherein the electronic device receives the second stop signal to thereby stop an operation of the battery charger.

18. The apparatus according to claim 16, wherein the electronic device is supplied with electric power from the battery pack.

19. The apparatus according to claim 18, further comprising a battery charger that charges the battery set.

20. The apparatus according to claim 16, wherein the electronic device comprises a battery charger mounted on the electronic device, said battery charger configured to charge the battery pack.

21. A method, said method comprising the steps of:
measuring a cell voltage of each of the battery cells in a first system to thereby generate a measurement voltage;
calculating an open circuit voltage appearing between opposite terminals of the battery set from the cell voltage of each of the battery cells to thereby generate a measurement voltage;
stopping the charging when a value of the cell voltage of any one of the battery cells reaches a threshold value;
measuring an open circuit voltage appearing between opposite terminals of the battery set in a second system to thereby generate a diagnostic voltage; and
stopping the charging based on a comparison result of a value of the measurement voltage and a value of the diagnostic voltage.

* * * * *